United States Patent
Bowers et al.

(10) Patent No.: US 10,180,325 B2
(45) Date of Patent: Jan. 15, 2019

(54) ORTHOGONAL-MODE LASER GYROSCOPE

(71) Applicant: The Regents of the University of California, Oakland, CA (US)

(72) Inventors: John E. Bowers, Santa Barbara, CA (US); Tin Komljenovic, Santa Barbara, CA (US); Roger Helkey, Santa Barbara, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/495,649

(22) Filed: Apr. 24, 2017

(65) Prior Publication Data
US 2017/0307375 A1 Oct. 26, 2017

Related U.S. Application Data

(60) Provisional application No. 62/326,152, filed on Apr. 22, 2016.

(51) Int. Cl.
*G01C 19/66* (2006.01)
(52) U.S. Cl.
CPC .................. *G01C 19/66* (2013.01)
(58) Field of Classification Search
CPC ......... G01C 19/66; G01C 19/64; G01C 19/72
See application file for complete search history.

(56) References Cited

U.S. PATENT DOCUMENTS

| 4,159,178 A | 6/1979 | Vali et al. |
| 4,219,275 A * | 8/1980 | Henry ................ G01C 19/68 356/472 |
| 4,396,290 A | 8/1983 | Morris |
| 4,681,446 A | 7/1987 | Yeh |
| 5,064,288 A | 11/1991 | Dyes et al. |

(Continued)

OTHER PUBLICATIONS

Jonathan S. Barton, et al., "A Widely Tunable High-Speed Transmitter Using an Integrated SGDBR Laser-Semiconductor Optical Amplifier and Mach-Zehnder Modulator", "IEEE Journal of Selected Topics in Quantum Electronics", dated Sep. 1, 2003, pp. 1113-1117, vol. 9, No. 5, Publisher: IEEE.

(Continued)

*Primary Examiner* — Jonathan Hansen
(74) *Attorney, Agent, or Firm* — Michael A. Collins; Billion and Armitage

(57) ABSTRACT

A fiber-optic gyroscope is disclosed, wherein the fiber-optic gyroscope has counter-propagating light signals in a closed-loop optical path, and where the light signals are characterized by an orthogonality that mitigates optical coupling between them. In some embodiments, the orthogonality is a difference in frequency of the two signals. In some embodiments, the orthogonality is a difference in the polarizations of the two signals. The orthogonality is imparted on the light signals by a non-reciprocal element that is optically coupled with the optical path. In some embodiments, a gain-balancing filter is also included to ensure that the loop gain for each light signal is substantially equal to one. In some embodiments, the light signals are provided by a gain element that is characterized by inhomogeneous broadening.

26 Claims, 12 Drawing Sheets

(56) References Cited

U.S. PATENT DOCUMENTS

| 8,937,296 | B2* | 1/2015 | Bowers | H01L 31/1852 |
| | | | | 257/14 |
| 9,212,912 | B1* | 12/2015 | Salit | G01C 19/727 |
| 9,703,045 | B2* | 7/2017 | Evans | G01J 1/4257 |
| 2009/0046294 | A1* | 2/2009 | Kaplan | G01C 19/72 |
| | | | | 356/460 |
| 2010/0265513 | A1* | 10/2010 | Schwartz | G01C 19/66 |
| | | | | 356/467 |

OTHER PUBLICATIONS

Alan Y. Liu et al., "High performance continuous wave 1.3 m quantum dot lasers on silicon", "Applied Physics Letters", dated Jan. 27, 2014, p. 4, vol. 104, 041104, Published in: US.

Hyundai Park, et al., "Hybrid silicon evanescent laser fabricated with a silicon waveguide and III-V offset quantum wells", "Optics Express", dated Nov. 14, 2005, p. 5, vol. 13, No. 23, Publisher: Optical Society of America.

\* cited by examiner

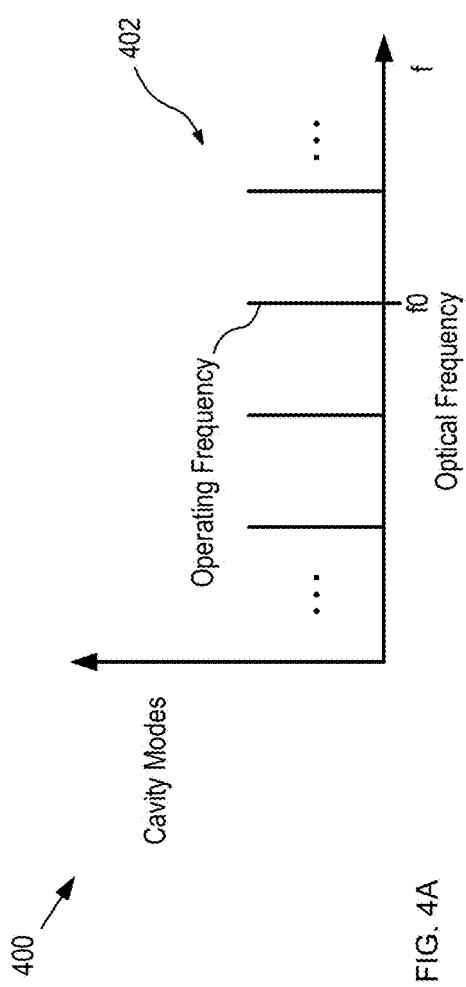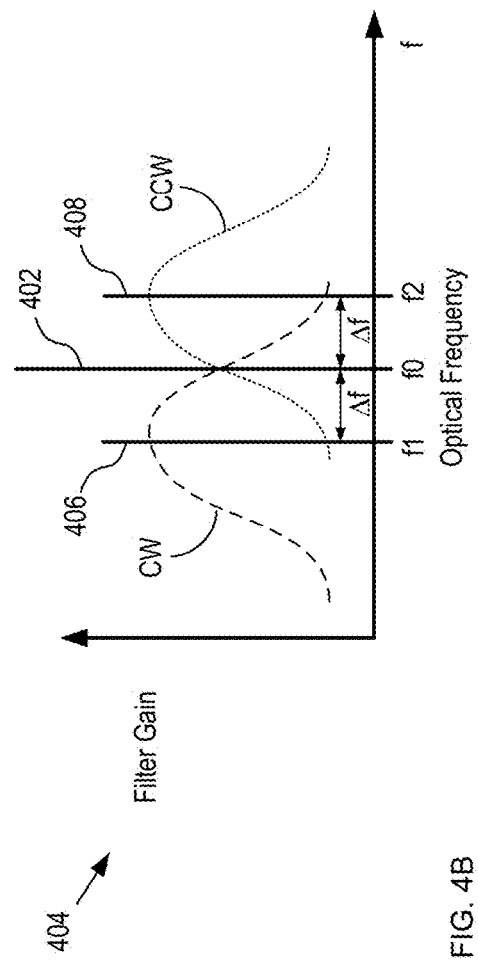
FIG. 4A
FIG. 4B

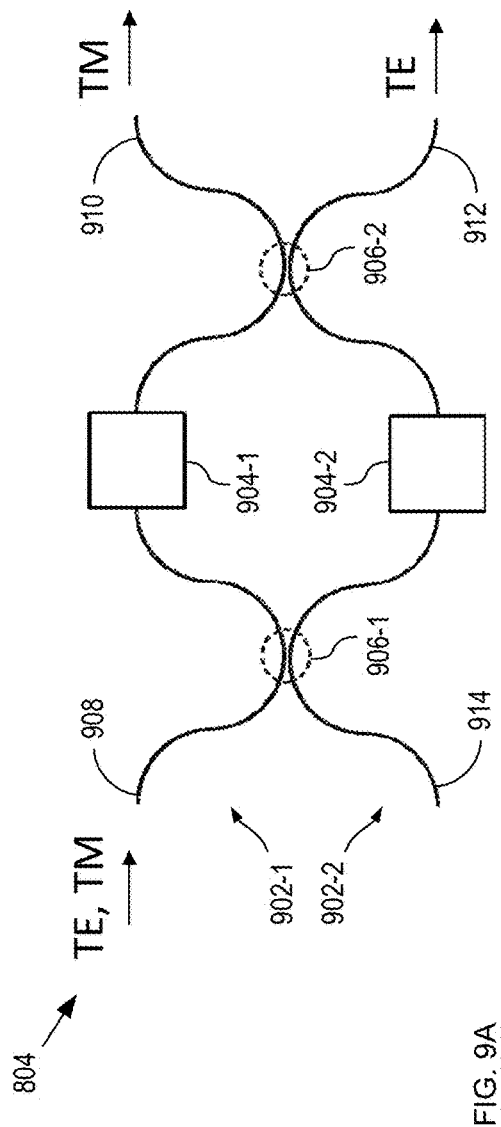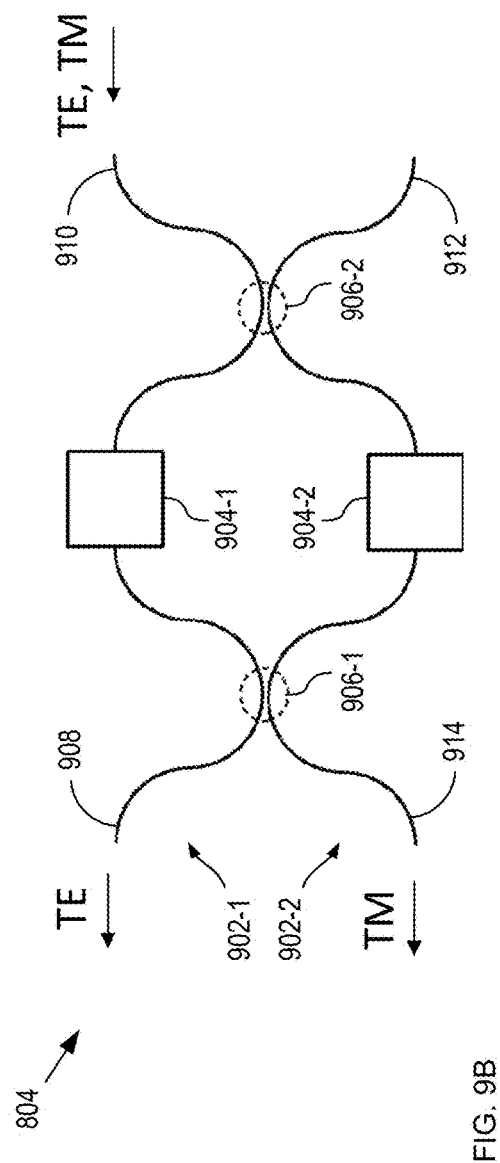
FIG. 9A
FIG. 9B

ORTHOGONAL-MODE LASER GYROSCOPE

RELATED APPLICATIONS

This application claims the benefit of U.S. Provisional Application No. 62/326,152 filed Apr. 22, 2016. The entire disclosure of U.S. Provisional Application No. 62/326,152 is incorporated herein by reference.

FIELD OF THE INVENTION

The present invention relates to inertial navigation devices in general, and, more particularly, to ring laser gyroscopes.

BACKGROUND OF THE INVENTION

Gyroscopes (a.k.a., gyros) are devices used to sense rotation. They have become a nearly indispensable tool for use in inertial navigation of objects and vehicles (particularly when reliance on a magnetic compass is insufficient or not possible), as well as many other applications. Rotational sensing is critical for precise guidance, and is often used in conjunction with accelerometers to enable "dead reckoning" of the position, orientation, speed, etc., of a moving object, such as a ship, submarine, satellite, guided missile, and the like. Increasingly, gyroscopes are making their way into non-military applications as well, such as land surveying, self-driving cars, sophisticated, multi-dimensional crash-detection and air-bag deployment systems, game controllers and cellphones.

Common gyroscope configurations include mechanical gyroscopes, MEMS-based gyroscopes, fiber-optic gyroscopes (FOG), ring laser gyroscopes (RLG), other optical waveguide gyroscopes, and a variety of other configurations. A mechanical gyroscope includes a mechanical system having a spinning wheel or disc whose axis of rotation is free to assume any orientation relative to the system. While the wheel rotates, the orientation of its axis of rotation is unaffected by any tilt or rotation of the overall system due to the conservation of angular momentum. By combining multiple spinning wheels whose axes are orthogonal, two- and three-axis systems can be formed. Unfortunately, mechanical gyros are typically quite large and massive. They are also typically sensitive to shock and vibration, and can have poor reliability due to fabrication tolerances, as well as mechanical wear over time.

The RLG was developed, in part, to mitigate some of the disadvantages of the mechanical gyro. A RLG senses changes in orientation by exploiting the Sagnac effect, wherein the frequencies of light signals travelling in opposite directions (i.e., clockwise "CW" and counterclockwise "CCW") within a planar waveguide loop are based on the angular velocity of the waveguide loop within its plane. When the RLG is not rotating (i.e., it is in its quiescent state), the two light signals have the same phase and frequency and the RLG returns a rotation reading of zero. When the RLG is subject to a rotational component within its plane, however, frequency splitting occurs between the CW and CCW light signals, giving rise to a difference in their frequencies that is proportional to the rate of rotation. The RLG then provides an output signal that is based on this frequency difference.

RLGs are particularly attractive in many applications due to their ability to provide extremely precise rotational rate information, lack of cross-axis sensitivity to outside influences, such as shock, vibration, etc., and their high reliability due to a lack of moving parts.

Unfortunately, prior-art fiber optic gyroscopes suffer from an effect often referred to as "frequency lock-up," which makes them unable to sense rotation that is below a certain threshold. Frequency lock-up (a.k.a., frequency lock-in) occurs when the rate of rotation of the waveguide loop is very low, which yields an optical-frequency difference between counter-propagating optical signals that is very small. Under these conditions, even very small reflections couple the CW and CCW propagating optical beams, causing them to lock together to the same optical frequency, giving rise to a rotation reading of zero. This frequency lock-up is sometimes solved by introducing mechanical dither to the system, but mechanical nature of dither system can reduce the reliability and performance under large shock and vibration.

The need for a fiber-optic gyroscope that does not exhibit frequency lock-up at low rotation rates remains, as yet, unmet in the prior art.

SUMMARY OF THE INVENTION

The present invention enables a ring-laser gyroscope in which frequency lock-up is mitigated by imparting an orthogonality on counter-propagating light signals to reduce or eliminate optical coupling between them. By making the CW and CCW propagating light signals orthogonal, any coupling between the light signals has little or no effect on either signal. In some embodiments, the orthogonality is provided by imparting an optical frequency difference on them such that their frequencies are different enough to avoid interference between them. In some embodiments, the orthogonality is imparted by providing the light signals with orthogonal polarizations.

An illustrative embodiment of the present invention is an RLG system having a closed-loop optical path that is optically coupled with an optical gain element, a non-reciprocal frequency filter, an output coupler, and a gain-balancing filter. The illustrative RLG is implemented in an integrated-optic platform employing silicon-photonics integration for integrating the optical gain element and gain-balancing filter.

In some embodiments, an RLG is based on an optical-fiber loop and discrete optical components, where at least one of the optical gain element, non-reciprocal frequency filter, and gain-balancing filter is optically coupled with the optical-fiber loop in conventional fashion.

In the illustrative embodiment, the non-reciprocal frequency filter is operative for controlling the frequency of each of the CW and CCW light signals and, therefore, the frequency separation between them. This separation is controlled to mitigate coupling between the CW and CCW light signals due to reflections in the optical path. The non-reciprocal frequency filter is a ring resonator structure arranged in an add-drop configuration, which is operatively coupled with a magneto-optic layer and an electromagnet in the form of a loop conductor having the same shape as the microring of the ring resonator. A non-reciprocal phase shift is imparted on the CW and CCW light signals by energizing the electromagnet with a drive current flowing through the loop conductor to produce a magnetic field at the ring. The magnitude of the frequency split between the light signals is controlled by controlling the drive current. The center frequency (i.e., the unperturbed resonance frequency of the microring) of the frequency filter is controlled by controlling the temperature of the microring via an integrated ohmic heater. In some embodiments, the frequency split is induced via a permanent magnet that gives rise to a fixed separation between the frequencies for the CW and CCW propagating light signals.

In some embodiments, the center frequency and frequency split of the frequency filter are both controlled by controlling the magnitude of the drive current applied to the electromagnet.

In some embodiments, the non-reciprocal frequency filter comprises at least one ring resonator arrangement that is configured as an all-pass filter. In some embodiments, the non-reciprocal frequency filter comprises a ring resonator whose resonance frequency is controlled by controlling carrier injection.

In some embodiments, the optical gain element comprises a quantum-well structure that is optically coupled with an integrated-optics waveguide to collectively define a hybrid silicon-evanescent device. In some of these embodiments, the quantum-well structure comprises one or more quantum dots or quantum-dot layers.

In some embodiments, the optical gain element is characterized by inhomogeneous broadening.

An embodiment of the present invention is a ring-laser gyroscope (RLG) comprising: a first optical path that is arranged as a closed loop; a gain element operative for providing a first light signal and a second light signal such that the first light signal propagates in the first optical path in a clockwise (CW) direction and the second light signal propagates in the first optical path in a counterclockwise (CCW) direction; and a first element that is optically coupled with the first optical path, the first element being operative for imparting orthogonality on the first and second light signals; wherein the orthogonality of the first and second light signals mitigates optical coupling of the first and second light signals.

Another embodiment of the present invention is a method for sensing rotation of a body, the method comprising: providing first and second light signals that counter-propagate around a first optical path that is immovably mechanically coupled with the body, wherein the first and second light signals are characterized by an orthogonal parameter that mitigates optical coupling between them; detecting a first optical frequency of the first light signal and a second optical frequency of the second light signal, wherein the first optical frequency and second optical frequency are dependent on the rate of rotation of the body; and computing the rotation of the body based on the first optical frequency and the second optical frequency.

BRIEF DESCRIPTION OF THE DRAWINGS

FIG. 4A depicts a plot of the resonant modes of optical path 102 in the absence of a non-reciprocal phase shift in NRFF 106.

FIG. 4B depicts a plot of the filter gain of NRFF 106 for CW- and CCW-propagating light signals.

FIGS. 9A-B depict schematic drawings of polarization-sensitive block 804 configured to receive polarized light signals from the left and right, respectively.

DETAILED DESCRIPTION

Figure 1:
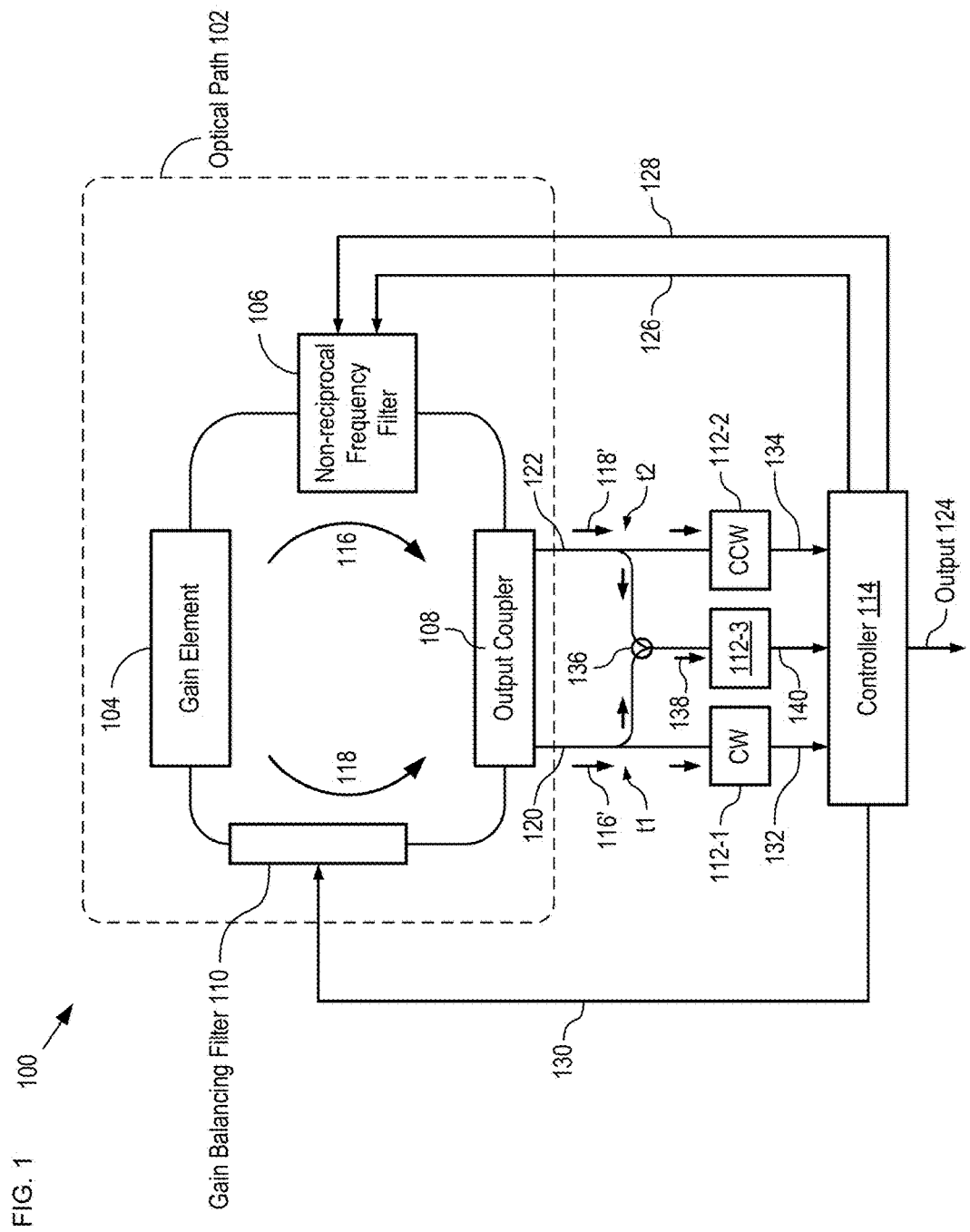
FIG. 1 depicts a schematic diagram of a ring-laser gyroscope in accordance with an illustrative embodiment of the present invention.

FIG. 1 depicts a schematic diagram of a ring-laser gyroscope in accordance with an illustrative embodiment of the present invention. RLG 100 comprises optical path 102, gain element 104, non-reciprocal frequency filter 106, output coupler 108, gain-balancing filter 110, detectors 112-1 through 112-3, controller 114, taps t1 and t2, and combiner 136.

Figure 2:
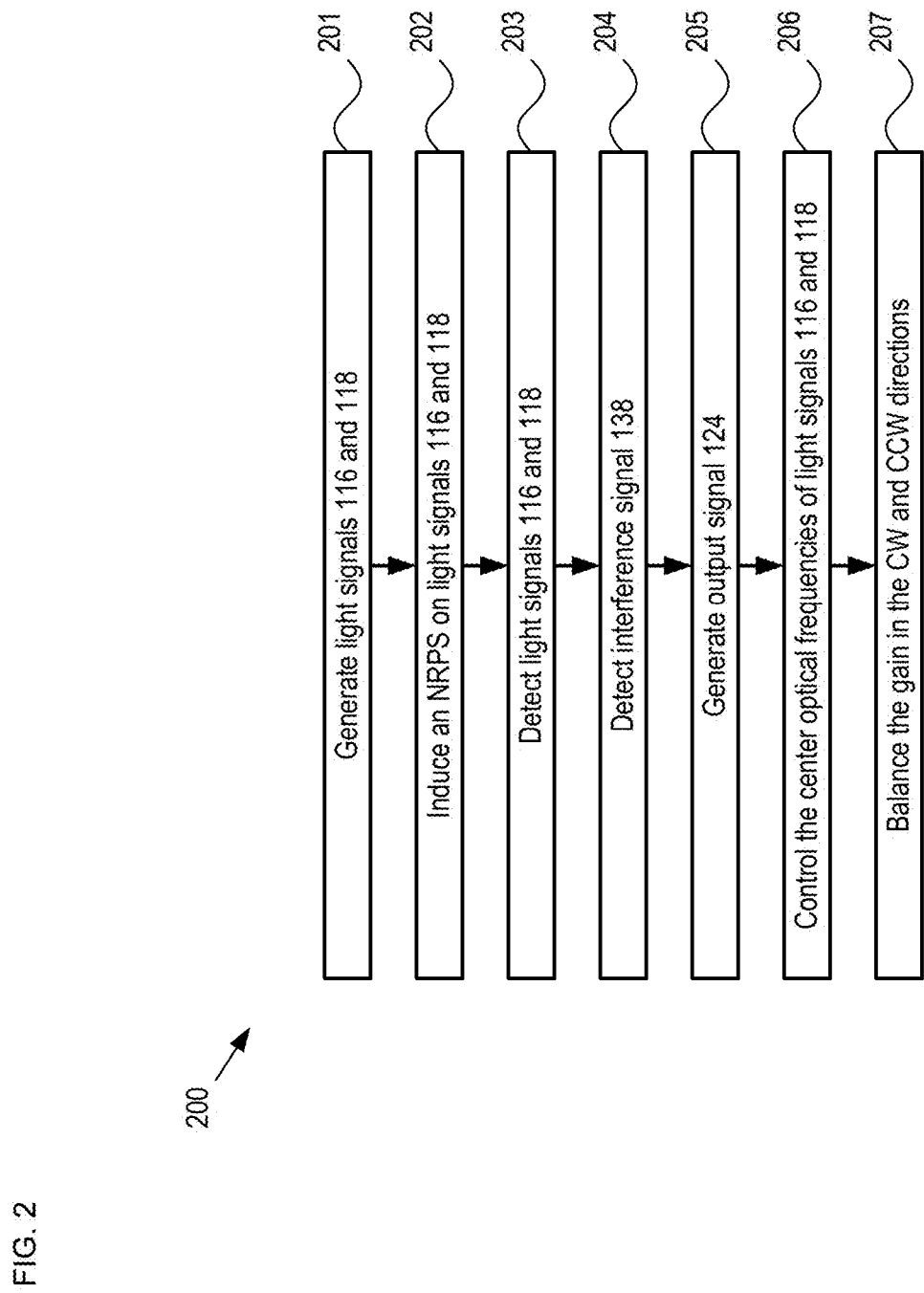
FIG. 2 depicts operations of a method for detecting rotation in accordance with the illustrative embodiment of the present invention.

FIG. 2 depicts operations of a method for detecting rotation in accordance with the illustrative embodiment of the present invention. Method 200 begins with operation 201, wherein RLG 100 generates light signals 116 and 118 in optical path 102. Method 200 is described herein with continuing reference to FIG. 1 as well as reference to FIGS. 3-5.

Optical path 102 is a closed-loop planar-lightwave circuit (PLC) comprising an integrated-optics waveguide formed as a substantially rectangular loop. The waveguide is optically coupled with each of optical gain element 104, non-reciprocal frequency filter 106, output coupler 108, and gain-balancing filter 110. In some embodiments, optical path 102 has a closed-loop shape other than a rectangle (e.g., a circle, oval, square, irregular shape etc.). In some embodiments, optical path 102 comprises a suitable optical waveguide structure other than a PLC integrated-optics waveguide, such as an optical fiber, etc. In some embodiments, optical path 102 includes a combination of optical waveguide structures and/or combination of optical waveguide structures and optical fibers.

Gain element 104 is an amplified spontaneous emission (ASE) source operative for providing light signals 116 and 118 such that they travel in the CW and CCW directions in optical path 102, respectively. In the depicted example, gain element 104 is a semiconductor optical amplifier (SOA) integrated with optical path 102 to form a hybrid silicon-evanescent device in accordance with methods disclosed in U.S. Pat. No. 8,937,296 and by Park, et al., in "Hybrid Silicon Evanescent Laser with a Silicon Waveguide and III-V Offset Quantum Wells," *Optics Express*, Vol. 13, pp. 9460-9464 (2005), each of which is incorporated herein by reference. In some embodiments, gain element 104 is another suitable device, such as an erbium-doped fiber, erbium-doped waveguide, indium gallium arsenide active region, or another conventional device operative for providing optical gain. In some embodiments, a gain layer is optically coupled with an integrated-optics waveguide loop to collectively define a gain element that extends over the entire optical path rather than a discrete gain element, such as gain element 104. In some of these embodiments, the gain layer and waveguide also collectively define a frequency filter that is also distributed over the length of the optical path.

At operation 202, non-reciprocal frequency filter 106 induces a non-reciprocal phase shift (NRPS) on light signals 116 and 118. This converts light signals 116 and 118 into orthogonal signals by separating their frequencies by a frequency difference sufficient to ensure that reflections in optical path 102 do not give rise to frequency lock-up at low rotation rates of RLG 100.

Figure 3A:
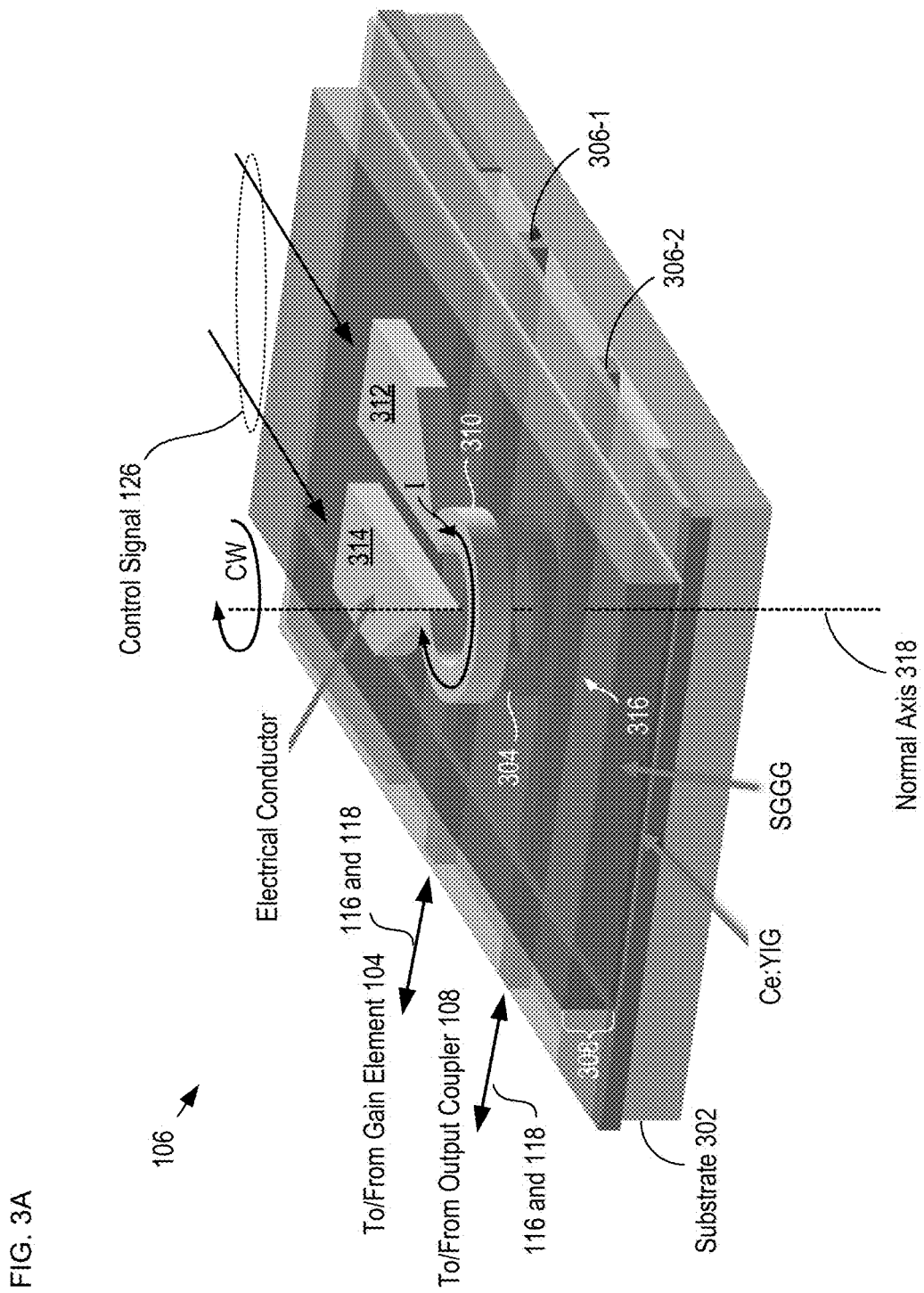
FIG. 3A depicts a schematic drawing of a perspective view of NRFF 106 in accordance with the illustrative embodiment.

FIG. 3A depicts a schematic drawing of a perspective view of NRFF 106 in accordance with the illustrative embodiment. NRFF 106 includes substrate 302, ring 304, bus waveguides 306-1 and 306-2, magneto-optic layer 308, and loop conductor 310. In NRFF 106, ring 304 and bus waveguides 306-1 and 306-2 are arranged in an add-drop configuration.

Non-reciprocal frequency filter 106 (hereinafter referred to as NRFF 106) is a device operative for controlling the frequencies of light signals 116 and 118. NRFF 106 exploits the fact that a non-reciprocal phase shift can be induced in an integrated-optics-based phase-sensitive device, such as a ring resonator or Mach-Zehnder interferometer, by coupling the device with a magneto-optic layer and applying an appropriate magnetic field to the resultant structure. In the depicted example, NRFF 106 includes a ring-resonator-based wavelength filter arranged in an add-drop configuration that is coupled with a magneto-optic layer and electromagnet. The frequencies of light signal 116 and 118 are controlled by controlling the magnitude and direction of a drive current applied to an electromagnet.

Substrate 302 is a conventional planar substrate suitable for supporting the formation of a planar-lightwave circuit. One skilled in the art will recognize that a PLC includes one or more surface waveguides (hereinafter referred to as waveguides) that are operative for conveying light. In the depicted example, substrate 302 comprises silicon dioxide; however, myriad materials are suitable for use in substrate 302 without departing from the scope of the present invention. For example, in some embodiments, substrate 302 is the buried oxide layer (BOX layer) of a conventional silicon-on-insulator (SOI) substrate. In some embodiments, substrate 302 is a glass substrate. In some embodiments, substrate 302 is a layer of silicon dioxide disposed on a planar-processing substrate (e.g., a silicon wafer, etc.).

Microring 304 is a circular closed-loop waveguide suitable for operation as a resonant element. In the depicted example, microring 304 has a radius of approximately 20 microns; however, in some embodiments, the radius of microring is other than 20 microns. In some embodiments, microring 304 has a shape other than a circle, such as a racetrack, ellipse, etc.

Bus waveguides 306-1 and 306-2 are a straight waveguides located in close proximity to microring 304. The gap between the bus waveguides and the microring are small enough that optical coupling between the waveguides can occur for frequencies at which the microring is resonant. Microring 304 and bus waveguides 306-1 and 306-2 collectively define ring resonator 316. In some embodiments, bus waveguides 306-1 and 306-2 are curved to optimize the optical coupling between them and microring 304.

In the depicted example, each of microring 304 and bus waveguides 306-1 and 306-2 is an air-cladded silicon waveguide having a thickness of approximately 215 nanometers (nm) and a width of approximately 600 nm. One skilled in the art will recognize that other dimensions and materials can be used for these waveguides without departing from the scope of the present invention.

Magneto-optic layer 308 includes a layer of Ce:YIG grown on a substituted gadolinium gallium garnet (SGGG) substrate. In the depicted example, the total thickness of the Ce:YIG layer and SGGG substrate is approximately 5 microns. It should be noted that magneto-optic layer 308 can comprise other materials and/or have a different thickness without departing from the scope of the present invention.

Magneto-optic layer 308 is bonded onto microring 304 and bus waveguides 306-1 and 306-2 via a conventional bonding technique, such as oxygen-plasma-assisted bonding. It should be noted that all of these materials are low loss at $\lambda$=1550 nm, with the exception of the Ce:YiG which has a propagation loss of 60 dB/cm.

Loop conductor 310 is a substantially circular loop of conductive material, such as a metal (e.g., gold, etc.). Loop conductor 310 has substantially the same shape as microring 302. Loop conductor 310 electrically connects terminals 312 and 314.

One skilled in the art will recognize that a ring resonator is characterized by a plurality of resonance frequencies that are separated by a spacing based on the transit time of light around its ring element. In NRFF 106, the spacing between these resonance frequencies is proportional to the reciprocal of the transit time of the light signals around optical path 102. The position of these resonance frequencies are tuned by controlling the refractive index of the guiding material of microring 304.

FIG. 4A depicts a plot of the resonant modes of optical path 102 in the absence of a non-reciprocal phase shift in NRFF 106. As indicated in plot 400, in the absence of current flow through loop conductor 310, NRFF 106 is characterized by a plurality of cavity modes 402, which are separated by substantially uniform spacing. In the absence of an NRPS at NRFF 106, optical path 102 is reciprocal; therefore, light propagates around the optical path in the same manner in the CW and CCW directions. As a result, each of light signals 116 and 118 is characterized by the same resonance frequencies (i.e., the unperturbed cavity modes 402). In the depicted example, the operating frequency of RLG 100 is selected as the cavity mode characterized by frequency f0.

When electrical current I flows between terminals 312 and 314 in response to feedback signal 126, the flow of electric current about normal axis 318 generates a magnetic field in the plane of microring 304. The presence of the magnetic field gives rise to different phase constants for the CW and the CCW TM modes in the microring, thereby achieving an NRPS between them. By virtue of the induced NRPS, bus waveguides 306-1 and 306-2 are optically coupled through microring 304 only at the CW resonance frequency for CW-propagating light and only at the CCW resonance frequency for CCW-propagating light. Loop gain in optical path 102, therefore, is different in the CW and CCW directions at the frequency of each of light signals 116 and 118.

FIG. 4B depicts a plot of the filter gain of NRFF 106 for CW- and CCW-propagating light signals. NRFF 106 enables gain 406 in the CW direction, which causes light signal 116 to lase at the mode frequency with the highest CW loop gain (i.e., f1). In similar fashion, NRFF 106 enables gain 408 in the CCW direction, which causes light signal 118 to lase at the mode frequency with the highest CCW loop gain (i.e., f2).

As a result, the frequencies of CW light signal 116 and CCW light signal 118 are displaced from the center frequency, f0, of ring resonator 316 in equal and opposite directions by Δf; therefore, light signal 116 is characterized by frequency f1 and light signal 118 is characterized by frequency f2. The magnitude of Δf is based on the strength of the induced magnetic field, which is based on the magnitude electric current I. As a result, the flow of electric current through loop conductor 310 creates a frequency difference between light signals 116 and 118, providing them orthogonality.

In the depicted example, the center frequency of microring 304 (i.e., the average frequency of light signals 116 and 118) is controlled by feedback signal 128, which controls the temperature of an integrated heater element thermally coupled with the microring (not shown).

In some embodiments, the center frequency of microring 304 is controlled by feedback signal 126, which adjusts the magnitude of current flow I through loop conductor 310 to control the temperature of the microring, thus avoiding the need for a separate heater element and feedback signal. In some embodiments, NRFF 106 includes other structure, such as p- or n-doped regions, that are operative for enabling carrier injection-based control over the frequencies. In some embodiments, the magnetic field applied to ring resonator 316 is provided by a fixed magnet.

Although NRFF 106 includes waveguides that are arranged in a ring-resonator-based add-drop configuration in the illustrative embodiment, it will be clear to one skilled in the art, after reading this Specification, how to specify, make, and use alternative embodiments wherein NRFF 106 comprises a different arrangement of rings and/or waveguides, such as all-pass configurations, multi-ring Vernier configurations, Mach-Zehnder configurations, etc. Further, in some embodiments, loop conductor 310 has a shape that is different than that of microring 304, and/or includes multiple turns (e.g., layers of conductor, a spiral shape, and the like) for to enable a stronger magnetic field, etc. Examples of alternative non-reciprocal frequency filters suitable for use in the present invention are described in U.S. Pat. No. 8,396,337, PCT Patent Application No. PCT/US17/16075, filed Feb. 2, 2016 and by Huang, et al., in "Silicon microring isolator with large optical isolation and low loss", *Proceedings of the Optical Fiber Conference (OFC)* 2016, each of which is incorporated herein by reference.

Figure 3B:
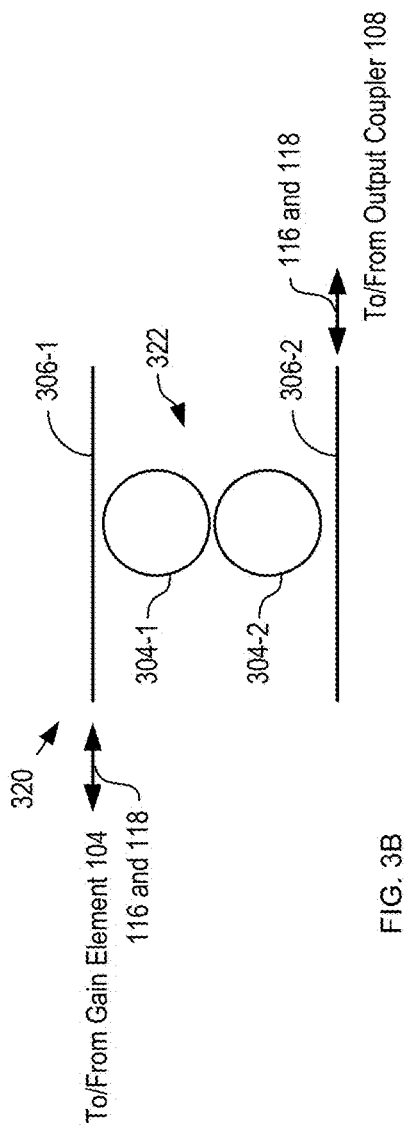
FIG. 3B depicts a schematic drawing of an alternative NRFF in accordance with the present invention.

FIG. 3B depicts a schematic drawing of an alternative NRFF in accordance with the present invention. NRFF 320 includes coupled-cavity filter 322, bus waveguides 306-1 and 306-2, and conductive loops 310-1 and 310-2, etc. (not shown).

Operation of NRFF 320 is analogous to that of NRFF 106; however, the inclusion of a coupled-cavity filter (i.e., Vernier structure) provides greater NRPS for a given magnitude of drive current I. One skilled in the art will recognize that the direction of the drive currents applied to microrings 304-1 and 304-2 must be opposite in order to couple CW- and CCW-propagating light through NRFF 320. In some embodiments, coupled cavity filter 322 includes more than two microrings.

Figure 3C:
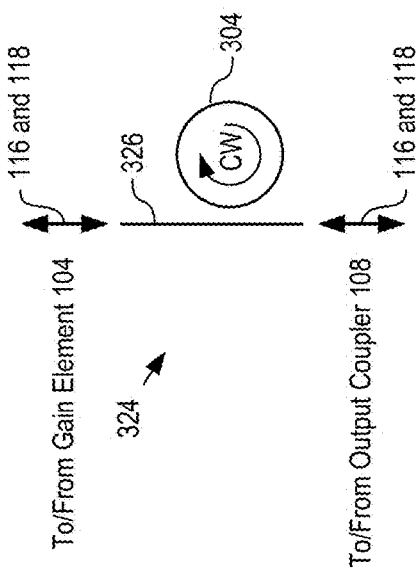
FIG. 3C depicts a schematic drawing of another alternative NRFF in accordance with the present invention.

FIG. 3C depicts a schematic drawing of another alternative NRFF in accordance with the present invention. NRFF 324 includes microring 304, bus waveguide 306-1, and conductive loop 310, etc. (not shown). NRFF 324 is analogous to that of NRFF 106; however, the microring and bus waveguide are arranged in an all-pass configuration that removes light at the resonance frequencies of microring 304 from bus waveguide 326.

In operation, NRFF 324 is driven by feedback signals 126 and 128 such that it is resonant at frequency f1 for light signals propagating in the CCW direction, which being resonant at frequency f2 for light signals propagating in the CW direction. As a result, NRFF 324 removes light at frequency f2 from light signal 116 as it propagates in the CW direction around optical path 102. In similar fashion, NRFF 324 removes light at frequency f1 from light signal 118 as it propagates in the CCW direction around optical path 102. Like NRFF 106, therefore, NRFF 324 mitigates coupling between these frequency components in the counter-propagating light signals.

In each of the NRFF examples described herein, the device is selectively operative for TM-mode light; however, one skilled in the art will recognize, after reading this Specification, that magneto-optic material can be disposed on the inner and/or outer surfaces of the microring to enable operation with TE-mode light.

Furthermore, although the depicted NRFF examples produce orthogonality in light signals 116 and 118 by separating their frequencies, in some embodiments, such orthogonality is induced by providing the light signals with different polarizations. For example, many optical waveguides support both a TE (transverse electric) and TM (transverse magnetic) polarization, and simple reflective coupling would not cause a portion of the reflected TE optical beam to interfere with the main TM optical beam, or vice-versa.

Returning now to method 200 and the illustrative embodiment, at operation 203, light signals 116 and 118 are detected at detectors 112-1 and 112-2.

To begin operation 203, a portion of each of light signals 116 and 118 is tapped from optical path 102 by output coupler 108. Specifically, output coupler 108 couples a portion of light signal 116 into output waveguide 120 as light portion 116' and a portion of light signal 118 into output waveguide 122 as light portion 118'.

Figure 5:
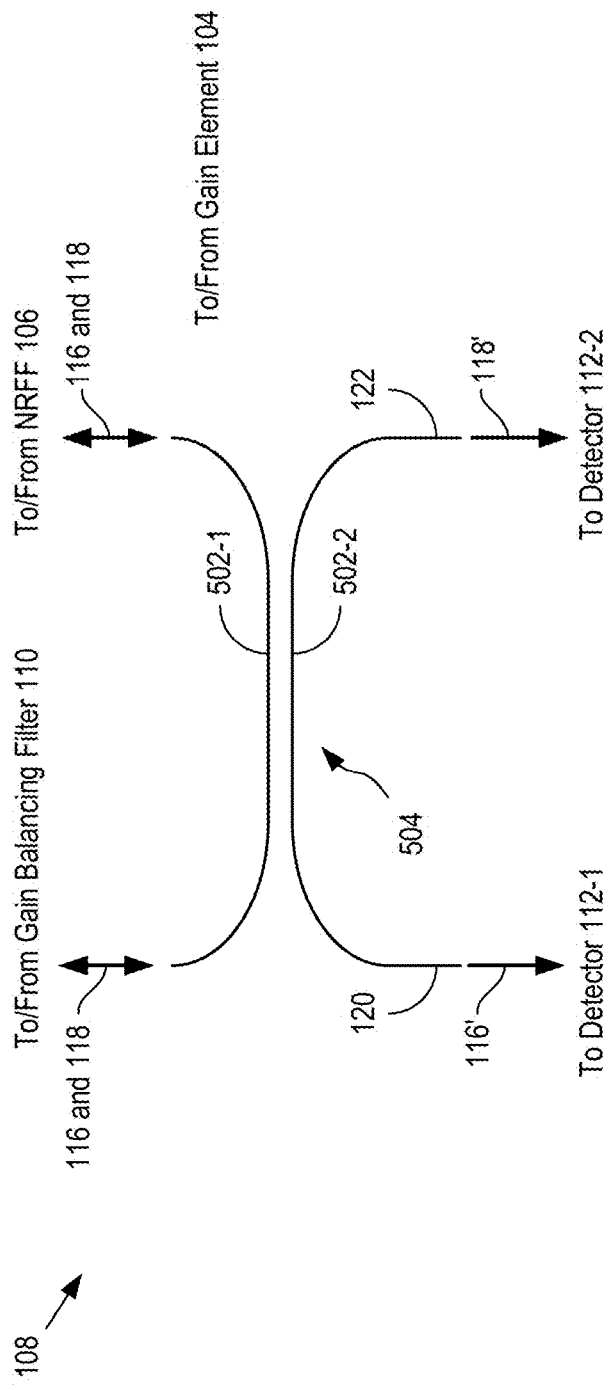
FIG. 5 depicts a schematic drawing of an optical coupler in accordance with the illustrative embodiment of the present invention.

FIG. 5 depicts a schematic drawing of an optical coupler in accordance with the illustrative embodiment of the present invention. Output coupler 108 includes bus waveguides 502-1 and 502-2, which are arranged to define conventional directional coupler 504.

In the depicted example, directional coupler 504 couples 1% of the optical energy of a light signal propagating through bus waveguide 502-1 into bus waveguide 502-2, which is optically coupled with each of output waveguides 120 and 122. In some embodiments, the waveguides are arranged to couple a different percentage of a light signal propagating through bus waveguide 502-1 into bus waveguide 502-2 (typically, within the range of 1% to 50%).

Although the depicted example comprises an output coupler that is a directional coupler, in some embodiments, output coupler 108 comprises a different conventional optical coupling element, such as an adiabatic coupler, a multimode interference (MMI) coupler, and the like.

As light portions 116' and 118' propagate through output fibers 120 and 122, conventional taps t1 and t2 (e.g., Y-junctions, directional couplers, etc.) direct a small percentage of light portions 116' and 118' (typically within the range of 1% to 50%) to detectors 112-1 and 112-2, respectively, and direct the remainder of each light portion to combiner 136.

Detectors 112-1 through 112-3 are conventional photo-sensitive devices (e.g., photodiodes, photodetectors, avalanche photodiodes (APD), etc.), which are operative for converting light signals into electrical signals. Detectors 112-1 and 112-2 detect light portions 116' and 118', respectively, and provide corresponding electrical signals 132 and 134 to controller 114.

Combiner 136 is a conventional optical signal combiner, such as a Y-junction, direction coupler, etc. Combiner 136 combines the two optical signals it receives from taps t1 and t2 as interference signal 138.

At operation 204, interference signal 138 is detected by detector 112-3, which provides corresponding electrical signal 140 to controller 114.

Interference signal 138 (and, therefore, electrical signal 140) includes a "beat" frequency that is a function of the difference in the center frequencies of light signal 120 and 122 and, therefore, the rate of rotation of RLG 100. For exemplary purposes, in a case in which optical path 102 is configured such that light signals 116 and 118 are adjacent cavity modes that are spaced at 100 MHz. When RLG 100 is in its quiescent state (i.e., not rotating), the detected beat frequency would be 100 MHz. When the RLG is rotating slightly, however, the beat frequency would be detected as 100 MHz+1 Hz. For rotation at the same rate in the opposite direction, the beat frequency would be detected as 100 MHz-1 Hz. As a result, both rotation rate and rotation direction can be determined from a single measured quantity—namely, the beat frequency. In contrast, prior-art RLGs typically require more complex detection hardware (e.g., phase-sensitive detectors, etc.) to determine rotation direction.

At operation 205, controller 114 generates output signal 124 based on electrical signals 132, 134, and 140, where the output signal is proportional to the rotation rate of optical path 102. In some embodiments, controller 114 extracts the beat frequency in electrical signal 140 via a low-pass filter and compensation for the difference in the center frequencies of CW light signal 116 and CCW light signal 118 induced by NRFF 106. In some embodiments, another known method of extracting the rotation of RLG 100 from light signals 116 and 118 is employed.

Controller 114 is a conventional microcontroller that receives electrical signals 132, 134 and 140 and provides output signal 124, which indicates the rotation of RLG 100.

At operation 206, controller 114 controls the frequencies of light signals 116 and 118 by providing feedback signals 126 and 128 to NRFF 106. Feedback signal 126 controls the magnitude of the resonance-frequency split (i.e., 2*Δf) between frequencies f1 and f2 of light signals 116 and 118, respectively, while feedback signal 128 controls the center frequency, f0, of ring resonator 316. In some embodiments, feedback signals 126 and 128 control the frequencies of light signals 116 and 118 such that they remain constant under all rotation conditions and output signal 124 is based on the magnitudes of these feedback signals.

One skilled in the art will recognize that, for lasing to occur, the gain in a round trip around the laser cavity must be approximately unity for a light signal to maintain constant amplitude. If the optical gain in both directions is different by even a small amount, the light signal propagating in one direction can clamp the optical gain slightly below threshold for the light signal propagating in the other direction, giving rise to unidirectional lasing. Unfortunately, in many prior-art RLGs, the optical path does not maintain equal amplitudes in both counter-propagating optical signals, which results in unidirectional lasing and, therefore, no capability to sense rotation. This problem can be particularly problematic for semiconductor lasers that are substantially homogeneously broadened (i.e., all of the contributions to the overall gain at the atom level are identical).

It is an aspect of the present invention, however, that the problem of unequal-gain-based unidirectional lasing can be mitigated by including a gain-balancing feedback loop that, in response to a control signal from controller 114, balances the optical gain in both the CW and CCW directions.

At operation 207, controller 114 controls the loop gain in each of the CW and CCW directions around optical path 102. To control the loop gain in each direction, controller 114 provides control signal 130 to gain-balancing filter 110.

Feedback signal 130 is based on the measured optical power in light signals 116 and 118. The derivative of optical power from each counter-propagating beam is calculated from these measurements to determine the optical gain in each direction. The optical power and the derivative of the optical power from each counter-propagating optical beam is combined with a model of the optical gain dynamics of the FOG in order to compute a change to feedback signal 130 and keep the optical power in both counter-propagating directions above a minimum optical power threshold using a Kalman filter or other known controller technique. From a series of measurements, a Kalman filter produces an estimate of current state variables, which in this case include the optical power in the CW 116 and CCW 118 direction, and the relative loop gain at the CW frequency and CCW frequency. These state variable estimates are used by the controller 114 to adjust control signals 126, 128, and 130 to maintain constant optical power in the CW 116 and CCW 118 direction, and maintain the desired optical frequencies. The design process for a feedback loop using a Kalman filter to stabilize the optical power in the CW 116 and CCW 118 direction is known to one skilled in the art.

Gain-balancing filter 110 is an element operative for controlling the relative gain in the CW and CCW directions in response to control signal 130. In the depicted example, gain-balancing filter 110 is an unbalanced Mach-Zehnder modulator with an unequal delay line to form a tunable frequency-dependent optical loss. In some embodiments, the function of gain-balancing filter 110 is performed within NRFF 106 by controlling the relative optical filter loss at the optical frequencies of each of CW light signal 116 and CCW light signal 118.

Gain-balancing filter 110 and gain element 104 (with control signal 130) collectively define a gain-balancing feedback loop that balances the optical gain in both directions. The dynamics of the RLG optical modes happen at a much longer timescale than in a traditional laser device, due to the long delay in the optical path 102. This longer timescale makes it feasible to control the relative power in the forward and reverse optical path using feedback-loop control techniques known to one skilled in the art.

Although the illustrative embodiment includes a gain-balancing filter within optical path 102, in some embodiments controller 114 controls the loop gain in optical path 102 by directly controlling gain element 104. Alternative implementations of controller 114 include known controller configurations such as FPGA, ASIC, and analog controllers.

In some embodiments of the present invention, the problem of unequal-gain-based unidirectional lasing is mitigated by including inhomogeneous broadening in gain element 104. Examples of inhomogeneous broadening using a gas-based gain medium to mitigate the unidirectional lasing problem are disclosed in U.S. Pat. No. 9,212,912, which is incorporated herein by reference. In such prior-art methods, motion of gas molecules in the gas-based optical-gain medium occurs due to thermal energy. This motion enables individual molecules to couple better into either the CW or CCW direction, thus preventing either counter-propagating optical beam from saturating the gain for the other beam. A gas-based gain medium is referred to as "inhomogeneously broadened" because it is a composite of different gain functions that saturate separately. Unfortunately, employing a gas-based gain medium increases RLG complexity and size.

It is an aspect of the present invention, however, that inhomogeneous broadening can more conveniently be achieved by employing a quantum-dot gain medium as the gain element itself. Self-organized quantum-dot gain material comprises a range of quantum dot sizes, which results in a range of gain regions, each with a narrow optical linewidth. By controlling NRFF 106 to separate the optical frequencies of CW signal 116 and CCW signal 118, these beams will interact differently with the distribution of quantum dots, preventing one of the counter-propagating optical beams from saturating the gain for the other optical beam.

It is yet another aspect of the present invention that the non-reciprocal ring-resonator included in NRFF 106 can alternatively be used as an optical isolator, which requires that the phase shift for one optical beam rotation at one optical frequency be 180° different than the phase shift for the counter-rotating optical beam. The minimum optical phase shift can be much smaller than 180° and still cause the CW and CCW beams to have different optical frequencies that are not significantly coupled to each other by small optical reflections.

Figure 6:
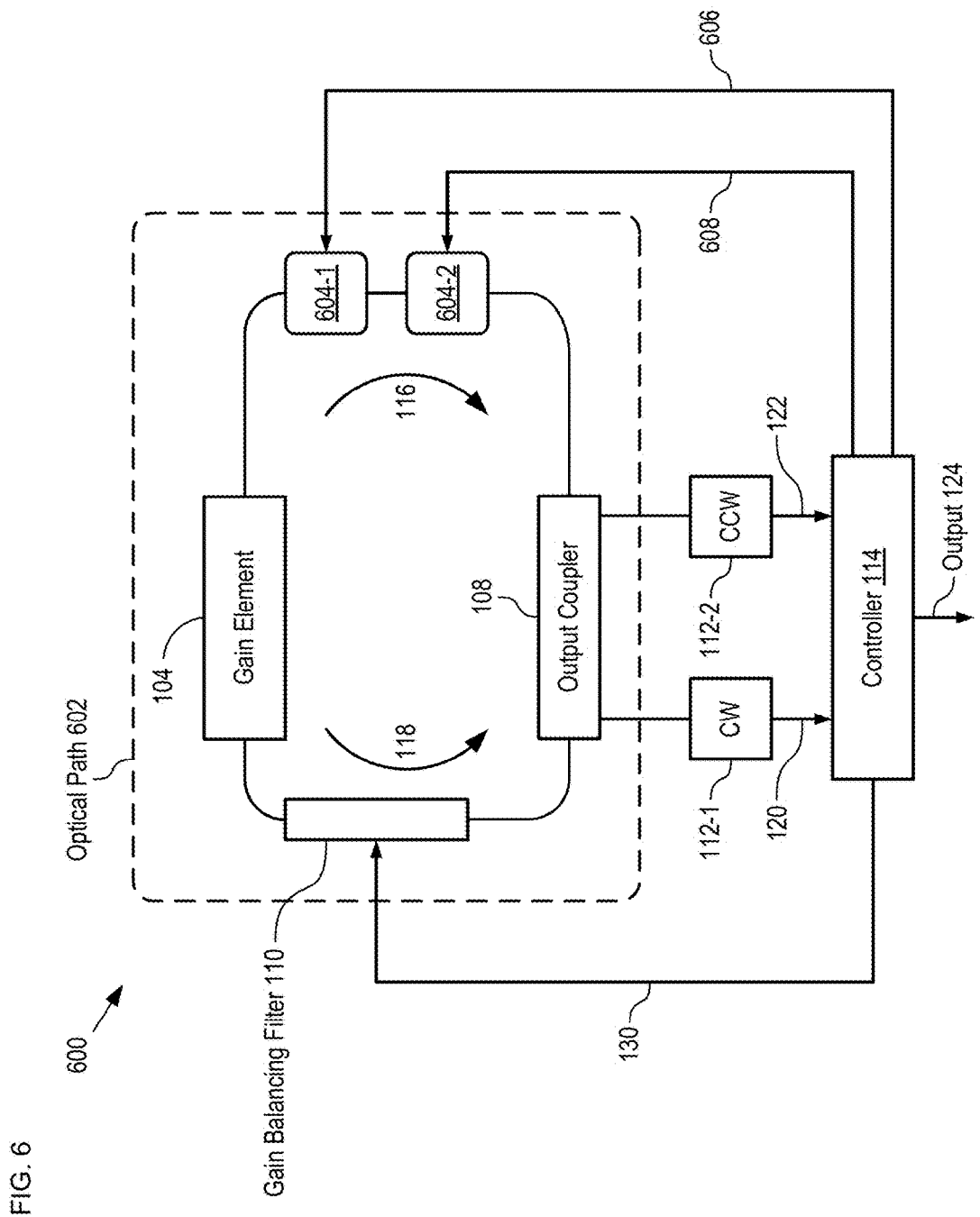
FIG. 6 depicts a ring-laser gyroscope in accordance with another alternative embodiment of the present invention.

FIG. 6 depicts a ring-laser gyroscope in accordance with another alternative embodiment of the present invention. RLG 600 is analogous to RLG 100; however, RLG 600 is based on an implementation wherein a plurality of frequency-dependent optical isolators is used to generate counter-propagating optical beams at different optical frequencies. RLG 600 comprises optical path 602, gain element 104, isolators 604-1 and 604-2, output coupler 108, gain-balancing filter 110, detectors 112-1 and 112-2, and controller 114.

Each of isolators 604-1 and 604-2 is analogous to NRFF 106; however, isolator 604-1 has a first ring resonator having an NRPS such that it passes a first optical frequency in CW signal 116, and attenuates a first optical frequency in CCW signal 118, while isolator 604-2 induces a second NRPS that alters the resonance frequency of its microring such that isolator 604-2 passes a second optical frequency in the CCW signal 118, and attenuates a second optical frequency in the CW signal 116. The responses of isolators 604-1 and 604-2 are based on control signals 606 and 608, respectively, which are provided to the isolators by controller 114.

Previous RLG implementations have been limited to a single CW-propagating light signal and single CCW-propagating light signal. In some alternative embodiments of the present invention, which are analogous to RLG 600, two CW-propagating light signals and two CCW-propagating light signals propagate through optical path 600. It should be noted that, in such embodiments, detectors 112-1 and 112-2 include filters to separate out the two optical frequencies from each port of output coupler 108.

Yet another aspect of the present invention is that the RLG optical lock-up problem can be mitigated by using a silicon nitride ($Si_3N_4$) integrated-optics-based waveguide loop (i.e., ring) and rare-earth elements, such as ytterbium, erbium, etc., to provide gain. The fact that gain can be provided by rare-earth elements deposited in the cladding of an integrated-optics waveguide is known in the art. For example, such gain elements are disclosed by Belt, et al., in "High Temperature Operation of an Integrated Erbium-Doped DBR Laser on an Ultra-Low-Loss $Si_3N_4$ Platform," *Optical Fiber Communication Conference/National Fiber Optic Engineers Conference* 2015, *OSA Technical Digest* (online), published by the Optical Society of America (2015), paper Tu2C.7, which is incorporated herein by reference.

Figure 7:
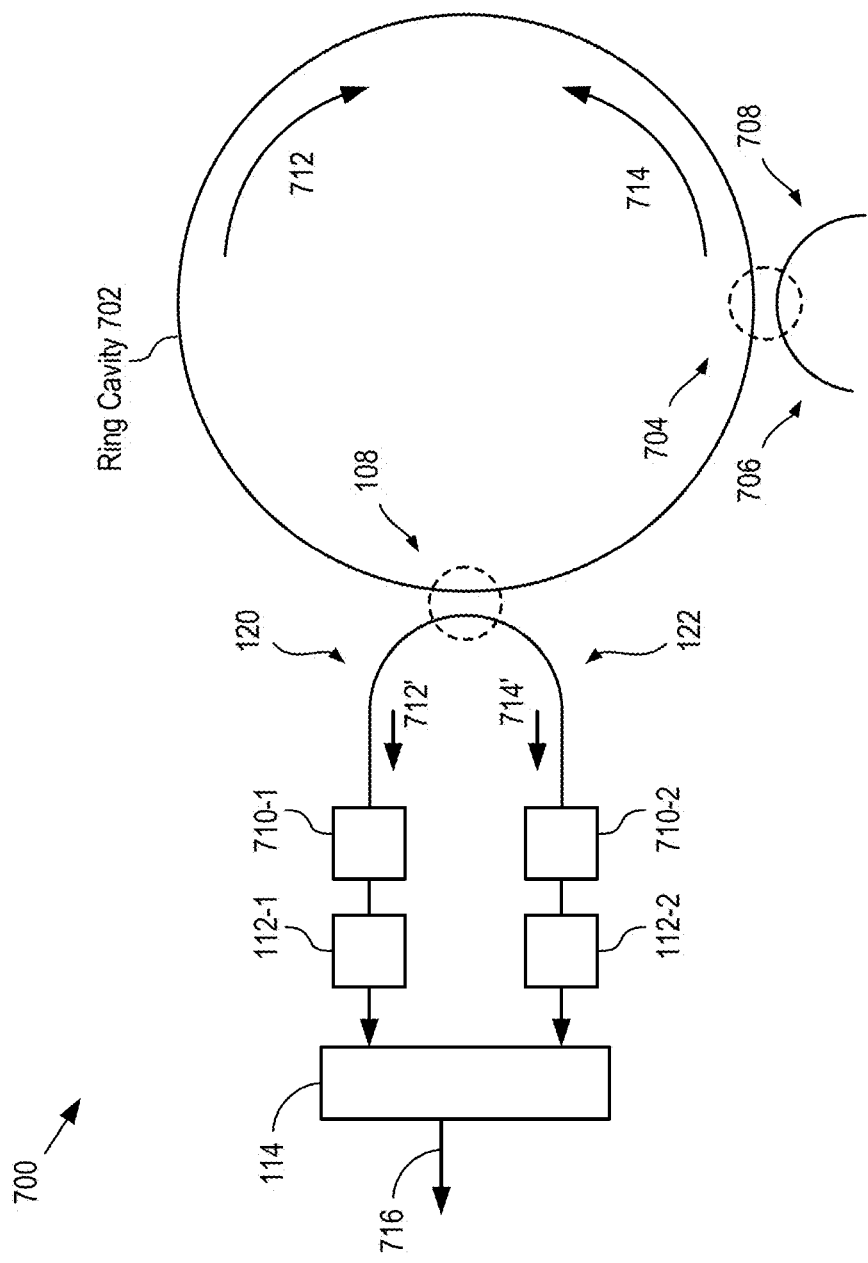
FIG. 7 depicts a schematic drawing of a ring-laser gyroscope in accordance with an alternative embodiment of the present invention.

FIG. 7 depicts a schematic drawing of a ring-laser gyroscope in accordance with an alternative embodiment of the present invention. RLG 700 comprises ring cavity 702, input coupler 704, output coupler 108, filters 710-1 and 710-2, detectors 112-1 and 112-2, and controller 114.

Ring cavity 702 is a long optical path that includes distributed rare-earth-based gain. Rare earth elements are pumped by an external pump laser, which is coupled to the ring cavity by input optical coupler 704. Gain in the optical path can be realized using quantum-dot gain medium or another known mechanism for providing optical gain.

Optical coupler 704 is a conventional optical coupler having optimized wavelength-selective coupling ratios for each of the pump and lasing wavelengths. For the lasing wavelength, the coupling is minimized. Pump light is provided via first coupler branch 706, second coupler branch 708, or both coupling branches at the same time. In some embodiments, two or more isotopes of rare-earth elements are used to reduce lock-in.

When the system is initialized, ring cavity 702 amplifies spontaneous emission to give rise to CW-propagating light signal 712 and CCW-propagating light signal 714.

Output coupler 108 couples a small portion of CW light signal 712 to output waveguide 120 as light portion 712' and a small portion of CCW light signal 714 to output waveguide 122 as light portion 714'. In some embodiments, output coupler 108 has optimized coupling coefficients to substantially minimize the coupling ratio for the pump wavelength.

Output waveguides 120 and 122 provide light portions 712' and 714' to detectors 112-1 and 112-2, respectively. En route, the light signals pass through filters 710-1 and 710-2, which attenuate light at the pump wavelength. In some embodiments, filters 710-1 and 710-2 are not included. In some embodiments, only one detector 112, with and without additional filter, is included in RLG 700.

Controller 114 receives the output signals from the detectors and provides output signal 716, which is proportional to the rotation rate of RLG 700. In addition, controller 114 controls the average resonator frequency with control signals (not shown).

Figure 8:
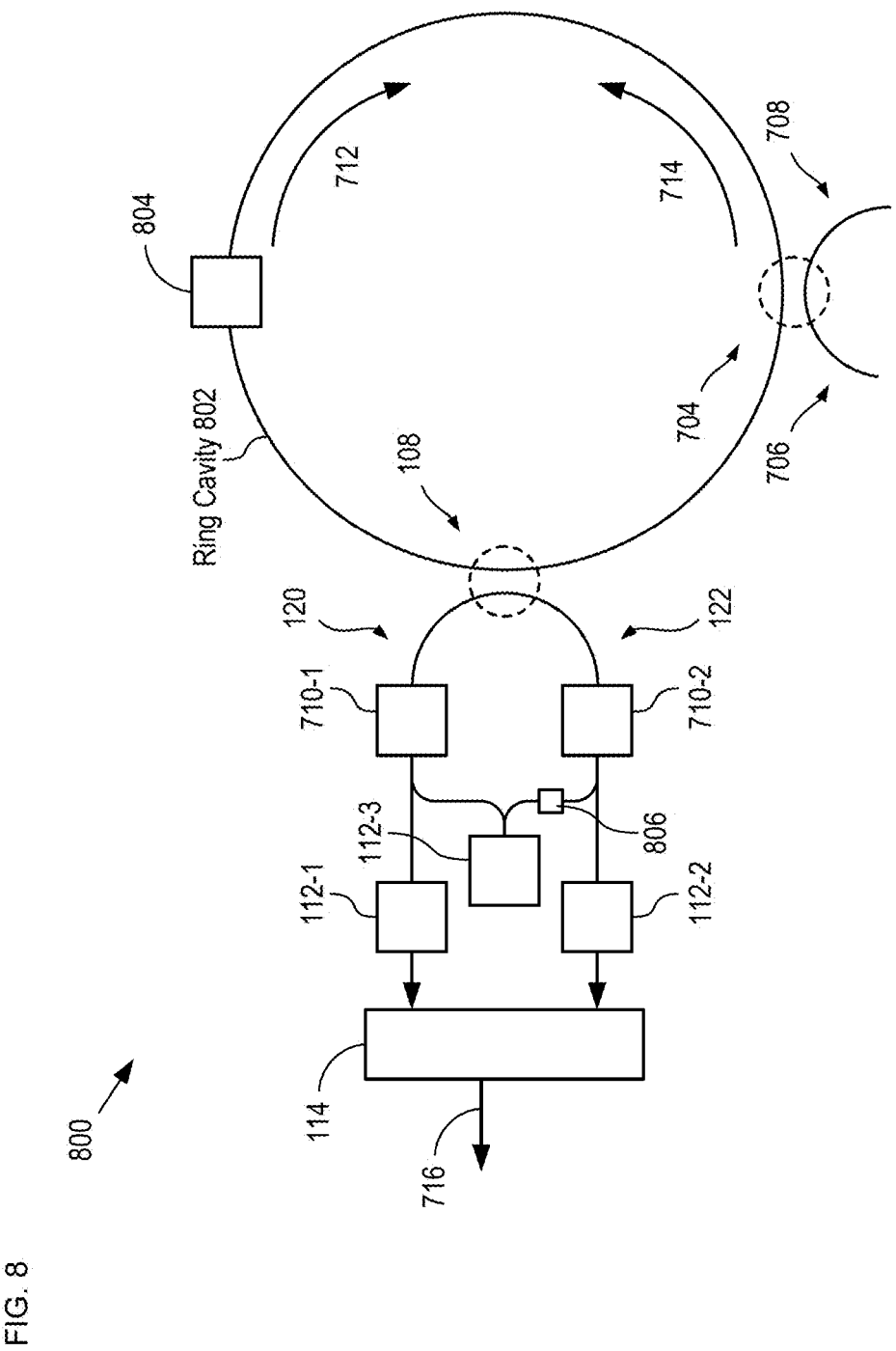
FIG. 8 depicts a schematic drawing of a ring-laser gyroscope in accordance with another alternative embodiment of the present invention.

FIG. 8 depicts a schematic drawing of a ring-laser gyroscope in accordance with another alternative embodiment of the present invention. RLG 800 is analogous to RLG 700; however, in RLG 800, ring cavity 802 also includes polarization-sensitive block 804.

The operation of RLG 800 is analogous to that of RLG 700. Ring cavity 802 amplifies spontaneous emission to give rise to CW-propagating light signal 712 and CCW-propagating light signal 714. In some embodiments, distributed or partly-distributed gain can also be used. In RLG 800, however, the preference for lasing in CW and CCW modes is controlled by polarization-dependent loss introduced by polarization-sensitive block 804.

Polarization-sensitive block 804 has low loss for TE polarized CW signal, high loss for TM-polarized light in CW-propagating light signal 712, low loss for TM-polarized light in CCW-propagating light signal 714, and high loss for TE-polarized light in CCW-propagating light signal 714, or vice-versa. The inclusion of polarization-sensitive block 804 mitigates frequency lock-in because the counter-propagating light signals are orthogonal due to their being at orthogonal polarizations.

FIGS. 9A-B depict schematic drawings of polarization-sensitive block 804 configured to receive polarized light signals from the left and right, respectively. Block 804 is a Mach-Zehnder (MZ) switch having first arm 902-1 and second arm 902-2, which include non-reciprocal elements 904-1 and 904-2, respectively. Arms 902-1 and 902-2 are optically coupled by optical couplers 906-1 and 906-2.

Optical couplers 906-1 and 906-2 are conventional optical couplers. Preferably, the coupling coefficients of couplers 906-1 and 906-2 is approximately 50%, presuming the propagation loss in both arms is approximately the same. In case of different propagation losses in arms 902-1 and 902-2, the coupling ratios of the couplers can be optimized to maximize the extinction ratio.

Each of non-reciprocal elements 904-1 and 904-2 is analogous to NRFF 106. In the depicted example, they are included to break the time-reversal symmetry of the system. Due to their inclusion, a light signal propagating from left to right will acquire different phase compared to a light signal propagating from right to left. Element 904-1 is optimized for TM polarization and element 904-2 is optimized for TE polarization. In some embodiments, the polarization characteristics of the non-reciprocal elements is reversed.

In the operation of polarization-sensitive block 804, when both TE- and TM-polarized light signals received at port 908 (as shown in FIG. 9A), the lengths of arms 902-1 and 902-2 are optimized to provide precise phase shift for TE light. TE light entering port 908 is not influenced by nonreciprocal element 904-2, so it is switched to port 912. Nonreciprocal element 904-1, however, controls an additional phase shift for TM polarization (i.e., increases or decreases) so it is switched to port 910. The required phase length to optimize the performance can be controlled in a number of ways including thermal tuning, carrier injection and other known tuning mechanisms.

When the system is reversed (i.e., TE and TM light signals enter at port 910, as depicted in FIG. 9B), the TM light phase does not change due to nonreciprocal element 904-1 and is switched to port 914. TE light phase is influenced by nonreciprocal element 904-2, however, and is switched to port 908.

It should be noted that polarization sensitive block 804 can be realized in a number of different ways that provide switching capability by introducing controlled non-reciprocal phase shifts without departing from the scope of the present invention.

Detection of the rotation rate and direction of RLG 800 is achieved in analogous fashion to that described above and with respect to RLG 100. Detectors 112-1 through 112-3 provide electrical signals based on light signals 120, 122, and the interference between light signals 120 and 122. It should be noted that RLG 700 includes optional polarization rotator 806, which converts the polarization of light signal 122 to match that of light signal 120, thereby facilitating a detectable interference between them when combined, thereby improving output signal 716 and the signal-to-noise ratio of RLG 700.

In some cases, the discrete nature of gain region 104 and frequency filter 106 can give rise to reflections of the propagating optical signals in optical path 102 due to the transitions between the regions. These reflections can degrade RLG performance.

It is another aspect of the present invention that a gain layer can be provided such that it is optically coupled with an integrated-optics waveguide to collectively define the optical path of an RLG to mitigate the generation of such reflections. Furthermore, the optical path can be configured such that most, if not all, of the optical path provides optical gain. In some embodiments, frequency filtering can also be provided in distributed fashion over the length of the optical path.

Figure 10:
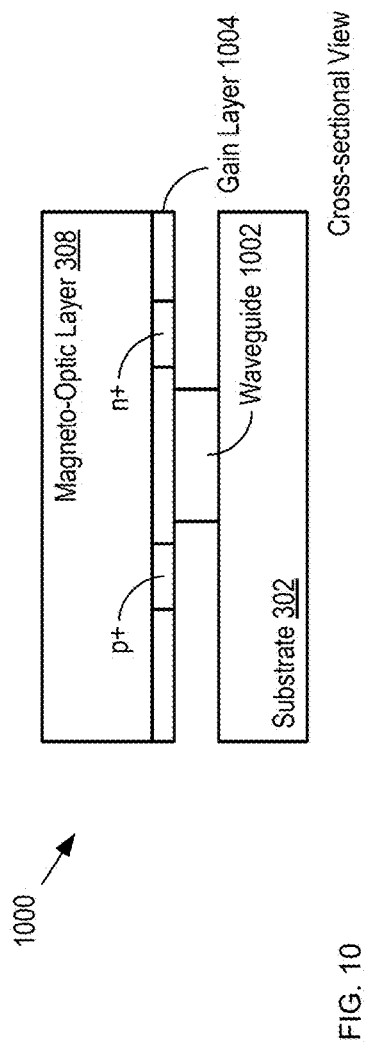
FIG. 10 depicts a cross-sectional view of a portion of the optical path of an RLG comprising an integrated gain layer and magneto-optic layer in accordance with the present invention.

FIG. 10 depicts a cross-sectional view of a portion of the optical path of an RLG comprising an integrated gain layer and magneto-optic layer in accordance with the present invention. RLG 1000 includes substrate 302, waveguide 1002, gain layer 1004, and magneto-optic layer 308.

Waveguide 1002 is an integrated-optics waveguide formed on substrate 302 such that it defines a closed-loop path that is analogous to optical path 102. In the depicted example, waveguide 1002 comprises single-crystal silicon and is analogous to bus waveguides 306-1 and 306-2 described above; however, in some embodiments, waveguide 1002 comprises a different waveguide materials, such as a III-V semiconductor (e.g., indium phosphide, gallium arsenide, etc.), a II-VI semiconductor (e.g., cadmium telluride, etc.), and the like.

Gain layer 1004 is a layer of compound semiconductor material comprising a multiple-quantum well structure. In some embodiments, the gain layer includes a different quantum-well structure, such as one or more quantum dots, a single quantum well, etc. Examples of gain layers in accordance with the present invention are described by Park, et al., in "Hybrid Silicon Evanescent Laser with a Silicon Waveguide and III-V Offset Quantum Wells," *Optics Express*, Vol. 13, pp. 9460-9464 (2005), as discussed above. Gain layer 1004 optionally includes a p-doped region and an n-doped region, located on either side of waveguide 1002, which enables lateral carrier injection to generate optical signals 116 and 118. The inclusion of optical gain layer 1004 such that it is optically coupled with waveguide 1002 over its length enables the gain to be substantially distributed over the entire length of the optical path of RLG 1000.

Magneto-optic layer 308 is disposed on gain layer 1004 such that the magneto-optic layer and the waveguide are operatively coupled to enable initiation of a non-reciprocal phase shift in waveguide 1002 in response to the flow of electric current through an electromagnet (not shown) disposed on the magneto-optic layer. The inclusion of a magneto-optic layer that is operatively coupled with waveguide 1002 over its entire length enables frequency filtering to be substantially distributed over the length of the optical path of RLG 1000.

Figure 11:
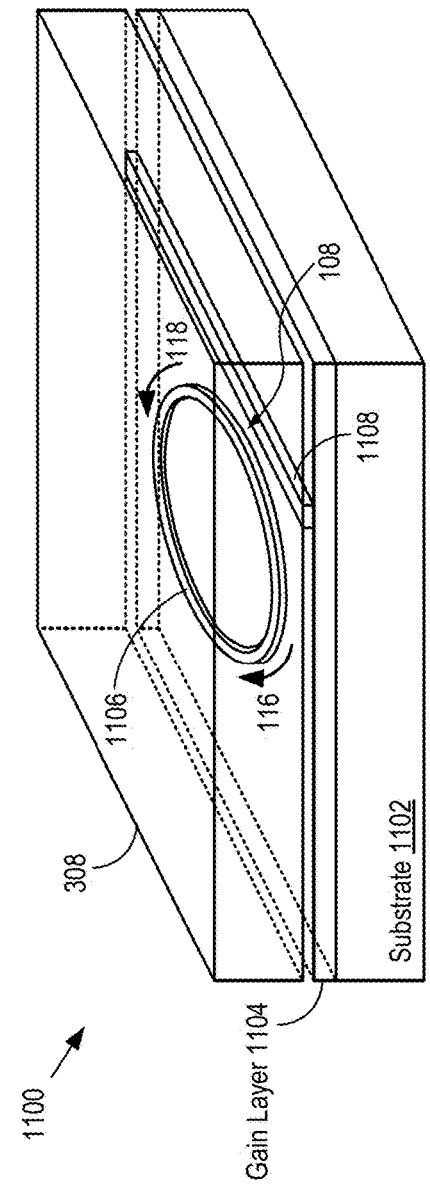
FIG. 11 depicts a perspective view of an RLG in accordance with an alternative embodiment of the present invention.

FIG. 11 depicts a perspective view of an RLG in accordance with another alternative embodiment of the present invention. RLG 1100 comprises substrate 1102, gain layer 1104, microring 1106, bus waveguide 1108, and magneto-optic layer 308.

Substrate 1102 is an indium phosphide substrate suitable for supporting formation of integrated-optics waveguides. In some embodiments, substrate 1102, is a different compound semiconductor substrate, such as gallium arsenide, indium-gallium-arsenide phosphide, cadmium telluride, and the like.

Substrate 1102 includes an epitaxially grown multiple-quantum well layer suitable for use as gain layer 1104, as well as an epitaxially grown waveguide core and cladding layers suitable for forming microring 1106 and bus waveguide 1108. Examples of epitaxially grown structures suitable for use in some embodiments of the present invention are described by Barton, et al., in "A Widely Tunable High-Speed Transmitter Using an Integrated SGDBR Laser-Semiconductor Optical Amplifier and Mach-Zehnder Modulator," *IEEE Journal of Selected Topics in Quantum Electronics*, Vol. 9, pp. 1113-1117 (2003), which is incorporated herein by reference.

Gain layer 1104 is analogous to gain layer 1004; however, gain layer 1104 is epitaxially grown directly on substrate 1102. Although the depicted example includes a gain layer that is a multiple-quantum well stack, one skilled in the art will recognize, after reading this Specification, that gain layer 1104 can comprise alternative structures, such as a single quantum well, quantum dots, quantum-dot layers, etc.

In the depicted example, microring 1106 and bus waveguide 1108 are channel waveguides formed in a layer disposed on substrate 1102. In the depicted example, each of the microring and bus waveguides comprises indium phosphide; however, in some embodiments, at least one of microring 1106 and bus waveguide 1108 comprises a different material, such as a III-V semiconductor, a group IV semiconductor, a II-VI semiconductor, etc. Microring 1106 and bus waveguide 1108 collectively define a ring-resonator-based all-pass filter, as described above, where optical coupling between the microring and bus waveguide occurs at output coupler 108.

Magneto-optic layer 308 is bonded with microring 1106 and bus waveguide 1108 such that they are operatively coupled to define a structure operative for inducing a non-reciprocal phase shift in microring 1106. As a result, RLG 1100 exhibits distributed gain throughout the entirety of the optical path, where the gain gives rise to lasing at different frequencies in the CW and CCW directions, thereby providing orthogonality to light signals propagating in each direction through the bus waveguide, as described above.

In some embodiments, substrate 1102 is a silicon-on-insulator substrate comprising a silicon active layer. To form gain layer 1104, a layer of indium arsenide quantum dots is epitaxially grown on the active layer. Once the quantum dots are formed, the quantum-dot layer and the active layer are patterned to define microring 1106 and bus waveguide 1108 such that each comprises a plurality of quantum dots disposed on its top surface. The formation of quantum-dots on silicon waveguides suitable for use in the present invention are disclosed, for example, by Liu, et al., in "High Performance Continuous Wave 1.3 μm Quantum Dot Lasers on Silicon," *Applied Physics Letters*, Vol. 104, pp. 041104-041104-4 (2014), which is incorporated herein by reference.

Once gain-enabled microring 1106 and bus waveguide 1108 are formed, magneto-optic layer 308 is bonded on the waveguides as described above.

Figure 12:
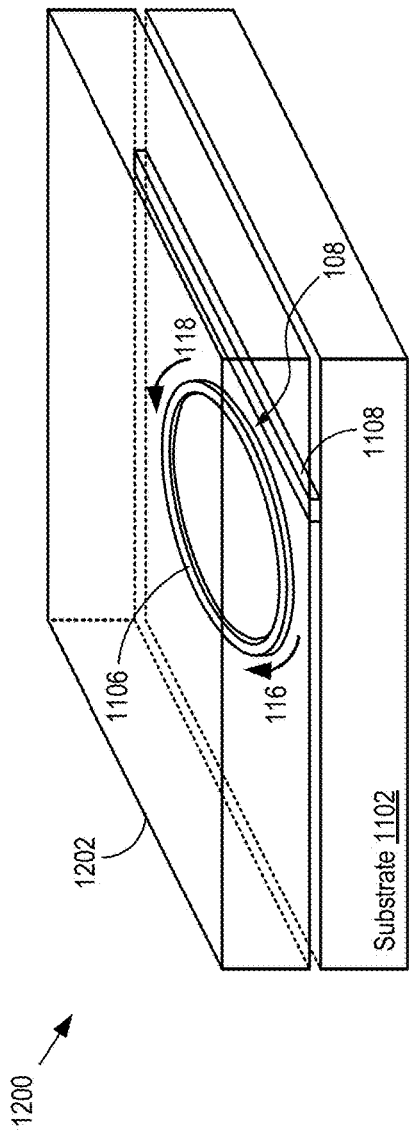
FIG. 12 depicts a schematic drawing of a perspective view of an embodiment of the present invention wherein a single layer provides both optical gain and magneto-optic capability.

FIG. 12 depicts a schematic drawing of a perspective view of an embodiment of the present invention wherein a single layer provides both optical gain and magneto-optic capability. RLG 1100 includes substrate 1102, microring 1106, bus waveguide 1108, and magnetic-semiconductor layer 1202. RLG 1200 is analogous to RLG 1100; however, gain layer 1104 and magneto-optic layer 308 are replaced by a single layer—magnetic-semiconductor layer 1202, which is disposed on microring 1106 and bus waveguide 1108.

In the depicted example, magnetic-semiconductor layer 1202 is composite structure comprising a silicon substrate having an epitaxially grown layer of indium arsenide quantum dots and a bonded layer of magneto-optic material. The silicon substrate is patterned to define microring 1106 and bus waveguide 1108 such that the microring exhibits gain distributed over its entire length by virtue of the quantum dots, as discussed above. In similar fashion, the presence of the magneto-optic material enables production of a non-reciprocal phase shift between light signals 116 and 118, as discussed above.

In some embodiments, magnetic-semiconductor layer 1202 comprises a layer of erbium-doped lanthanum cobaltite ($LaCoO_3$); however, one skilled in the art will recognize, after reading this Specification, that such embodiments require injection of pump light into the microring to provide the signal on which amplification is performed. It should be noted that any properly doped dilute magnetic semiconductor (DMS) can be used in magnetic-semiconductor layer 1202 without departing from the scope of the present invention. Materials suitable for use in magnetic-semiconductor layer 1202 include, without limitation, zinc-oxide-based DMS, titanium-oxide-based DMS, and the like. In some embodiments, a dopant other than erbium is included in magnetic-semiconductor layer 1202.

Figure 13:
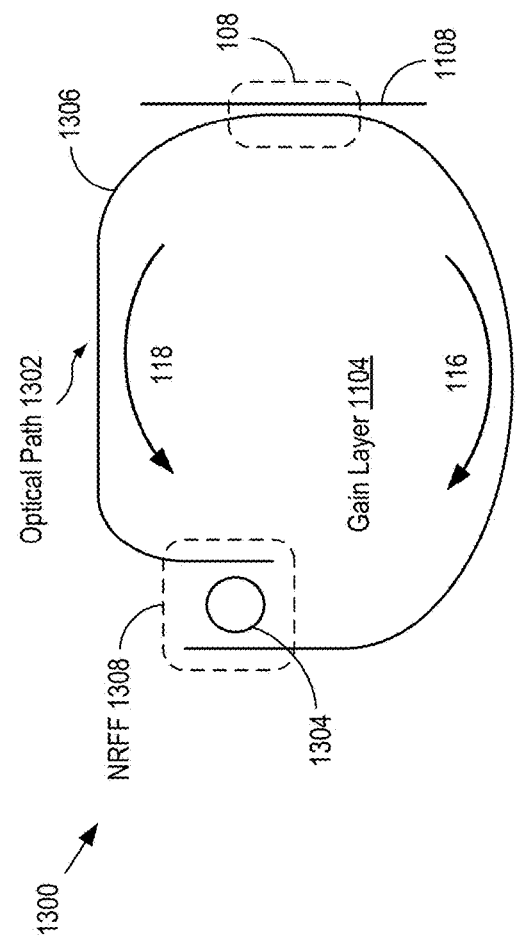
FIG. 13 depicts a schematic drawing of a top view of an RLG in accordance with another alternative embodiment of the present invention.

FIG. 13 depicts a schematic drawing of a top view of an RLG in accordance with another alternative embodiment of the present invention. RLG 1300 is analogous to RLG 1100; however, RLG 1300 also includes an integrated non-reciprocal frequency filter.

Optical path 1302 includes microring 1304, waveguide 1306, and bus waveguide 1108. Microring 1304 and waveguide 1306 are indium phosphide waveguides that are substantially analogous to microring 1106 and bus waveguide 1108, respectively.

Microring 1304 and the two open ends of waveguide 1304 collectively define NRFF 1308, which is analogous to NRFF 106 described above. In response to a drive current flowing in an electromagnet formed on magneto-optical layer 308 (not shown), NRFF 1308 produces a non-reciprocal phase shift in counter-propagating light signals 116 and 118, as described above.

By virtue of the inclusion of gain layer 1104 and NRFF 1308, RLG 1300 exhibits both distributed gain and an integrated frequency filter.

It is to be understood that the disclosure teaches just some examples of embodiments in accordance with the present invention and that many variations of the invention can easily be devised by those skilled in the art after reading this disclosure and that the scope of the present invention is to be determined by the following claims.

What is claimed is:

1. A ring-laser gyroscope (RLG) comprising:
   a first optical path that is arranged as a closed loop, wherein the first optical path is a closed-loop planar-lightwave circuit (PLC) disposed on a substrate;
   a gain element operative for providing a first light signal and a second light signal such that the first light signal propagates in the first optical path in a clockwise (CW) direction and the second light signal propagates in the first optical path in a counterclockwise (CCW) direction; and
   a first element that is optically coupled with the first optical path, the first element being operative for imparting an orthogonality on the first and second light signals, wherein the first element has a first state in which no orthogonality is imparted on the first and second light signals and a second state in which an orthogonality is imparted on the first and second light signals;

wherein the first and second light signals are unpolarized and propagate in the same manner in the CW and CCW directions when the first element is in the first state; and wherein optical coupling between the first and second light signal is mitigated when the first element is in the second state.

2. The RLG of claim 1 wherein the orthogonality is selected from the group consisting of an optical frequency difference and a polarization difference.

3. The RLG of claim 1 further comprising a second element that is optically coupled with the first optical path, the second element being operative for balancing the optical power in the first and second light signals.

4. The RLG of claim 3 wherein the first element and the second element are the same element.

5. The RLG of claim 1 wherein the first element is a non-reciprocal frequency filter comprising:
   a ring resonator;
   a first bus waveguide that is optically coupled with the first optical path;
   a first layer comprising a magneto-optic material, the first layer being operatively coupled with the ring resonator; and
   a first source that is operative for providing a magnetic field to the ring resonator to induce a non-reciprocal phase shift (NRPS) on the first and second light signals.

6. The RLG of claim 5 wherein the source comprises a loop conductor that is operative for generating the magnetic field in response to an electric current flowing through the loop conductor.

7. The RLG of claim 6 wherein the first element further comprises a heater, the heater being operative for controlling the temperature of the ring resonator.

8. The RLG of claim 1 wherein the first element comprises a polarization-sensitive block that is operative for imparting the orthogonality as different polarizations on the first and second light signals.

9. The RLG of claim 8 wherein the polarization-sensitive block imparts TE polarization on one of the first and second light signals and TM polarization on the other one of the first and second light signals.

10. The RLG of claim 9 wherein the polarization-sensitive block comprises:
    a Mach-Zehnder switch having a first arm and a second arm, the first and second arms being optically coupled via each of a first and second optical coupler, wherein the first arm includes a first non-reciprocal element that is between the first and second optical coupler, and wherein the second arm includes a second non-reciprocal element that is between the first and second optical coupler.

11. The RLG of claim 1 wherein the gain element includes:
    at least one quantum well; and
    an integrated-optics waveguide that is optically coupled with the first optical path;
    wherein the at least one quantum well and the integrated-optics waveguide are operatively coupled such that they collectively define a hybrid silicon-evanescent device.

12. The RLG of claim 1 wherein the gain element includes:
    at least one quantum dot; and
    an integrated-optics waveguide that is optically coupled with the first optical path;
    wherein the at least one quantum dot and the integrated-optics waveguide are operatively coupled such that they collectively define a hybrid silicon-evanescent device.

13. The RLG of claim 1 wherein the gain element comprises a gain layer that is optically coupled with a first integrated-optics waveguide that is included in the first optical path, and wherein the gain element provides optical gain to each of the first light signal and second light signal in distributed fashion over the length of the first optical path.

14. The RLG of claim 1 wherein the first element is operative for imparting orthogonality on the first light signal and the second light signal by inducing a non-reciprocal phase shift in the first and second lights signals in distributed fashion over the length of the first optical path.

15. The RLG of claim 1 wherein the first element comprises:
    a first layer comprising a magnetic-semiconductor material, the first layer being operatively coupled with the first optical path; and
    a first source that is operative for providing a magnetic field to the first optical path to induce a non-reciprocal phase shift (NRPS) on the first and second light signals.

16. The RLG of claim 15 wherein the first layer is further operative for providing optical gain to each of the first light signal and second light signal in distributed fashion over the length of the first optical path.

17. A method for sensing rotation of a body, the method comprising:
    providing a first optical path that is a closed-loop planar-lightwave circuit (PLC) disposed on a substrate, wherein the first optical path is optically coupled with a gain element for providing a first light signal that propagates in the first optical path in a clockwise (CW) direction and a second light signal that propagates in the first optical path in a counterclockwise (CCW) direction;
    providing a first element that is optically coupled with the first path, the first element being operative for imparting an orthogonality on the first and second light signals, wherein the first element has a first state in which it does not impart orthogonality on the first and second light signals and a second state in which the orthogonality is imparted on the first and second light signals such that optical coupling between them is mitigated;
    providing the first and second light signals in the first optical path such that they are unpolarized and propagate in the same manner in the CW and CCW directions when the first element is in the first state;
    putting the first element in the second state;
    detecting a first optical frequency of the first light signal and a second optical frequency of the second light signal, wherein the first optical frequency and second optical frequency are dependent on the rate of rotation of the body; and
    computing the rotation of the body based on the first optical frequency and the second optical frequency.

18. The method of claim 17 further comprising balancing the optical power in the first and second light signals.

19. The method of claim 17 wherein the first and second light signals are provided by operations comprising:
    enabling a gain element to produce amplified spontaneous emission that is coupled into the first optical path in each of the CW and CCW directions; and
    controlling the orthogonal parameter for light propagating in each of the CW and CCW directions.

20. The method of claim 19 wherein the orthogonal parameter is an optical frequency difference, and wherein the optical frequency of each of the first and second light signals is controlled via a frequency filter that imparts a non-reciprocal phase shift on the light propagating in the CW and CCW directions.

21. The method of claim 19 wherein the gain element is provided such that it is characterized by inhomogeneous broadening.

22. The method of claim 19 wherein the orthogonal parameter is a polarization difference, and wherein the polarization of each of the first and second light signals is controlled via a non-reciprocal element that is optically coupled with the first optical path.

23. The method of claim 17 wherein the first and second light signals are provided by a gain element comprising a gain layer that is optically coupled with a first integrated-optics waveguide that is included in the first optical path, and wherein the gain element is dimensioned and arranged to provide optical gain to each of the first light signal and second light signal in distributed fashion over the length of the first optical path.

24. The method of claim 17 wherein the first and second light signals are provided by a gain element comprising a gain layer that is optically coupled with a first integrated-optics waveguide that is included in the first optical path, and wherein the gain element includes at least one quantum well that is operatively coupled with the first integrated-optics waveguide such that they collectively define a hybrid silicon-evanescent device.

25. The RLG of claim 17 further comprising imparting the orthogonal parameter on the first light signal and the second light signal by inducing a non-reciprocal phase shift in the first and second lights signals in distributed fashion over the length of the first optical path.

26. The method of claim 17 wherein the first and second light signals are provided by a gain element comprising a gain layer that is optically coupled with a first integrated-optics waveguide that is included in the first optical path, and wherein the gain element includes at least one quantum dot that is operatively coupled with the first integrated-optics waveguide such that they collectively define a hybrid silicon-evanescent device.

* * * * *